(12) United States Patent
Chen et al.

(10) Patent No.: US 11,548,578 B2
(45) Date of Patent: Jan. 10, 2023

(54) MODULAR VEHICLE BODY AND METHOD FOR MANUFACTURING MODULAR VEHICLE BODY

(71) Applicant: Foxtron Vehicle Technologies Co., Ltd., New Taipei (TW)

(72) Inventors: Chia-Hong Chen, New Taipei (TW); Kai-Wei Tseng, New Taipei (TW); Chih-Ming Lai, New Taipei (TW)

(73) Assignee: Foxtron Vehicle Technologies Co., Ltd., New Taipei (TW)

(*) Notice: Subject to any disclaimer, the term of this patent is extended or adjusted under 35 U.S.C. 154(b) by 113 days.

(21) Appl. No.: 17/218,550

(22) Filed: Mar. 31, 2021

(65) Prior Publication Data

US 2022/0111917 A1    Apr. 14, 2022

(30) Foreign Application Priority Data

Oct. 12, 2020    (CN) .......................... 202011084974.4

(51) Int. Cl.
| | |
|---|---|
| *B60J 7/00* | (2006.01) |
| *B62D 63/02* | (2006.01) |
| *B62D 25/02* | (2006.01) |
| *B62D 25/08* | (2006.01) |
| *B62D 25/20* | (2006.01) |

(Continued)

(52) U.S. Cl.
CPC .............. *B62D 63/025* (2013.01); *B60K 1/04* (2013.01); *B62D 21/155* (2013.01); *B62D 25/025* (2013.01); *B62D 25/082* (2013.01); *B62D 25/2036* (2013.01); *B60K 2001/0438* (2013.01)

(58) Field of Classification Search
CPC ......... H01R 24/62; Y02T 10/70; Y02T 90/14; Y02T 10/7072; B64C 39/024; B60Q 3/258; B60R 16/0238; G07C 5/008
See application file for complete search history.

(56) References Cited

U.S. PATENT DOCUMENTS

| | | | |
|---|---|---|---|
| 2,035,800 A * | 3/1936 | Drauz ................. | B62D 25/025 296/209 |
| 2,193,949 A * | 3/1940 | Tibbetts .............. | B62D 25/082 296/203.02 |

(Continued)

FOREIGN PATENT DOCUMENTS

| | | |
|---|---|---|
| CN | 108001532 A | 5/2018 |
| CN | 110198886 A | 9/2019 |

(Continued)

*Primary Examiner* — Kiran B Patel
(74) *Attorney, Agent, or Firm* — ScienBiziP, P.C.

(57) ABSTRACT

A modular vehicle body includes a pair of outer frames. An inner board space with a fixed width is defined between the outer frames. Each outer frame includes a front side board and a door sill. The front side board includes a main board provided with a vertical board having a predetermined width. A first flange is provided on a side of the vertical board. The door sill includes an inner board provided with a horizontal board having a predetermined width. A second flange is provided on a side of the horizontal board. The inner board is fixedly coupled to the main board. The first flange and the second flange form an outer edge. A width between the outer edges of the pair of outer frames is set to correspond to a width of a vehicle body.

10 Claims, 8 Drawing Sheets

(51) Int. Cl.
*B60K 1/04* (2019.01)
*B62D 21/15* (2006.01)

(56) References Cited

U.S. PATENT DOCUMENTS

| | | | | |
|---|---|---|---|---|
| 2,645,519 | A * | 7/1953 | Stanfield | B62D 25/082 |
| | | | | 280/124.141 |
| 2,662,793 | A * | 12/1953 | Lindsay | B62D 25/2045 |
| | | | | 280/847 |
| 2,875,841 | A * | 3/1959 | Henderson | B60K 13/06 |
| | | | | 180/311 |
| 3,941,261 | A * | 3/1976 | Ricci | A61G 3/061 |
| | | | | 296/25 |
| 5,346,276 | A * | 9/1994 | Enning | B62D 25/088 |
| | | | | 296/203.02 |
| 7,234,765 | B1 * | 6/2007 | Mazzei | B62D 29/001 |
| | | | | 296/203.03 |
| 2017/0144706 | A1 * | 5/2017 | Bach | B62D 21/157 |
| 2017/0253278 | A1 * | 9/2017 | Mildner | B62D 25/025 |
| 2018/0229772 | A1 * | 8/2018 | Erlacher | B62D 25/2036 |

FOREIGN PATENT DOCUMENTS

| | | |
|---|---|---|
| CN | 209795613 U | 12/2019 |
| CN | 110654474 A | 1/2020 |
| TW | 201221398 A1 | 6/2012 |
| WO | 2012/117204 A1 | 9/2012 |

* cited by examiner

MODULAR VEHICLE BODY AND METHOD FOR MANUFACTURING MODULAR VEHICLE BODY

FIELD

The subject matter herein generally relates to vehicles, and more particularly to a modular vehicle body and a method for manufacturing the modular vehicle body.

BACKGROUND

Generally, each kind of vehicle has a different vehicle design with different wheelbases and different widths, and the body of the vehicle must be redesigned, which greatly increases labor costs. Each redesign requires a new strength verification, which is time-consuming, and the vehicle body needs to be re-molded, resulting in a significant increase in manufacturing costs.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 1:
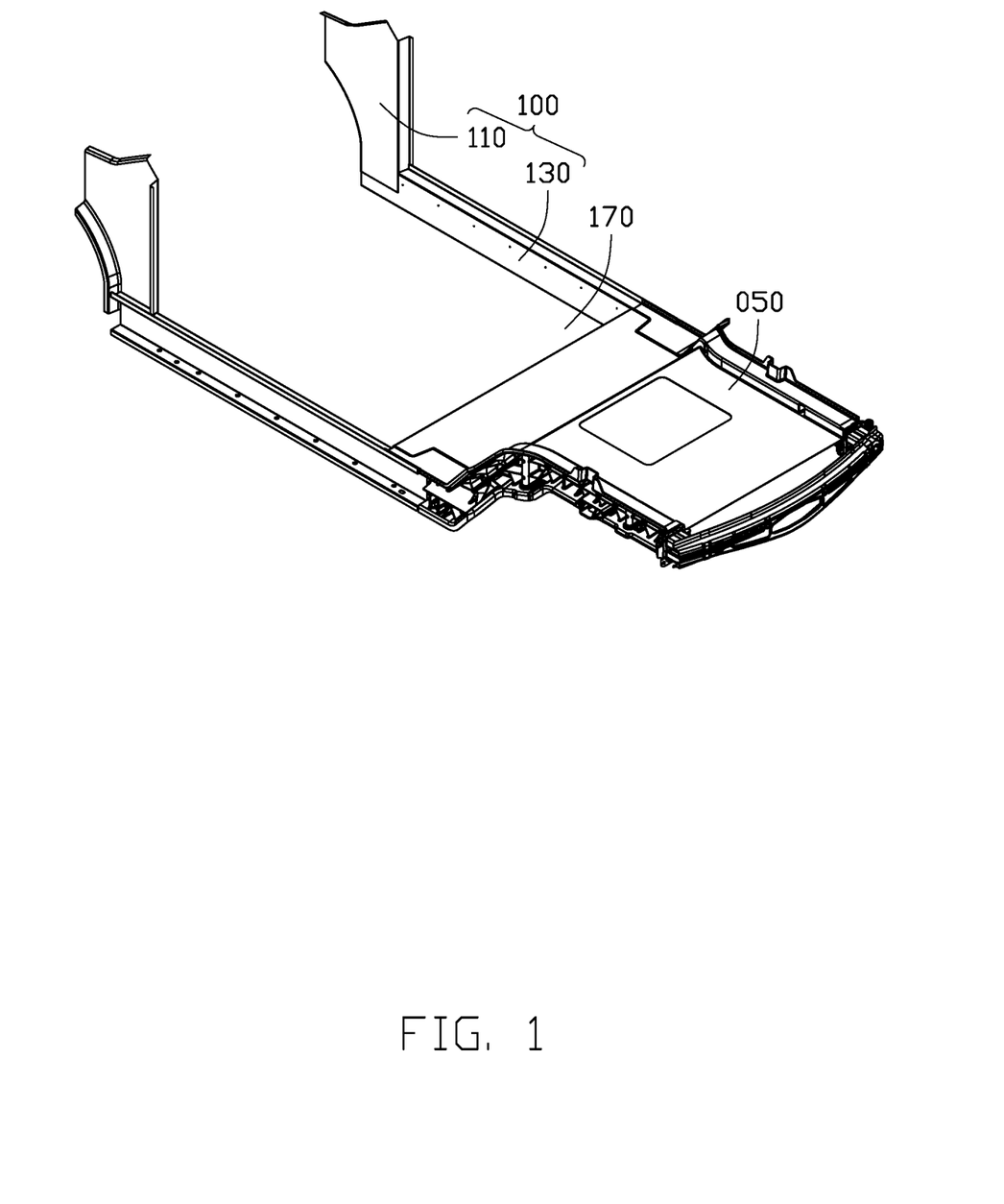
FIG. 1 is a schematic diagram of a modular rear compartment and outer frames of a modular vehicle body.
Figure 2:
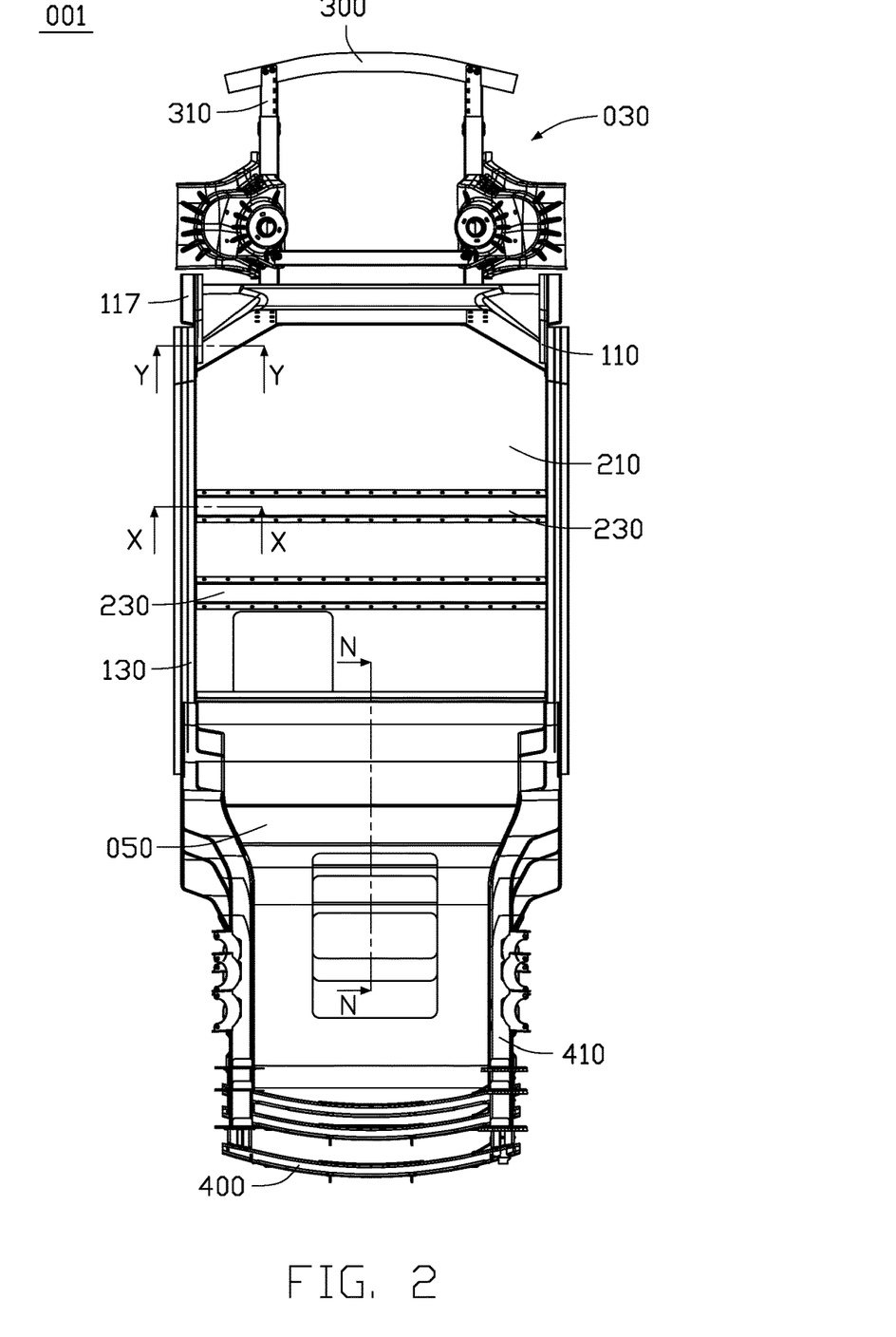
FIG. 2 is a schematic diagram of a first class, second class, and third class of a modular vehicle body.
Figure 5:
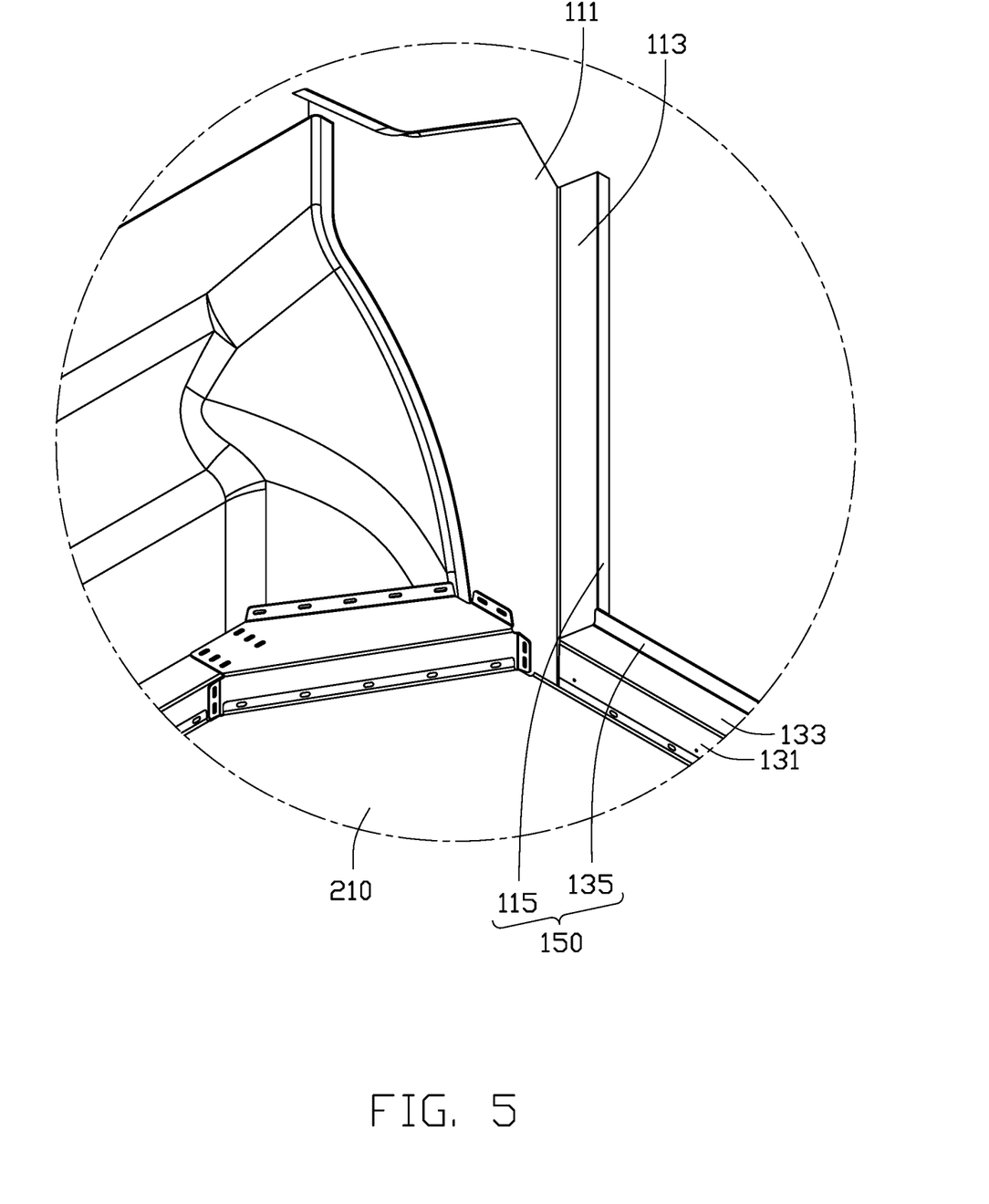
FIG. 5 is an enlarged view of circled portion V in FIG. 4.

FIGS. 1, 2, and 5 show a first embodiment of a modular vehicle body 001. The modular vehicle body 001 includes a front floor module 010, and the front floor module 010 includes a pair of oppositely arranged outer frames 100. An inner board space 170 having a fixed width is defined between the pair of outer frames 100. Each outer frame 100 includes a front side board 110 and a door sill 130. The front side board 110 includes a main board 111. The main board 111 is provided with a vertical board 113 extending a predetermined distance away from the inner board space 170. A side of the vertical board 113 facing away from the inner board space 170 is provided with a first flange 115. The door sill 130 includes an inner board 131. The inner board 131 is provided with a horizontal board 133 extending a predetermined distance away from the inner board space 170. A side of the horizontal board 133 facing away from the inner board space 170 is provided with a second flange 135. The inner board 131 is fixedly coupled to the main board 111. The first flange 115 and the second flange 135 form an outer edge 150. The first flange 115 and the second flange 135 can be coupled to an outer body shell. The outer edges 150 of the two opposite outer frames 100 are set to correspond to a width of the vehicle body. The vertical board 113 and the horizontal board 133 with corresponding specifications and widths can be selected to adapt to vehicles of different widths.

Figure 4:
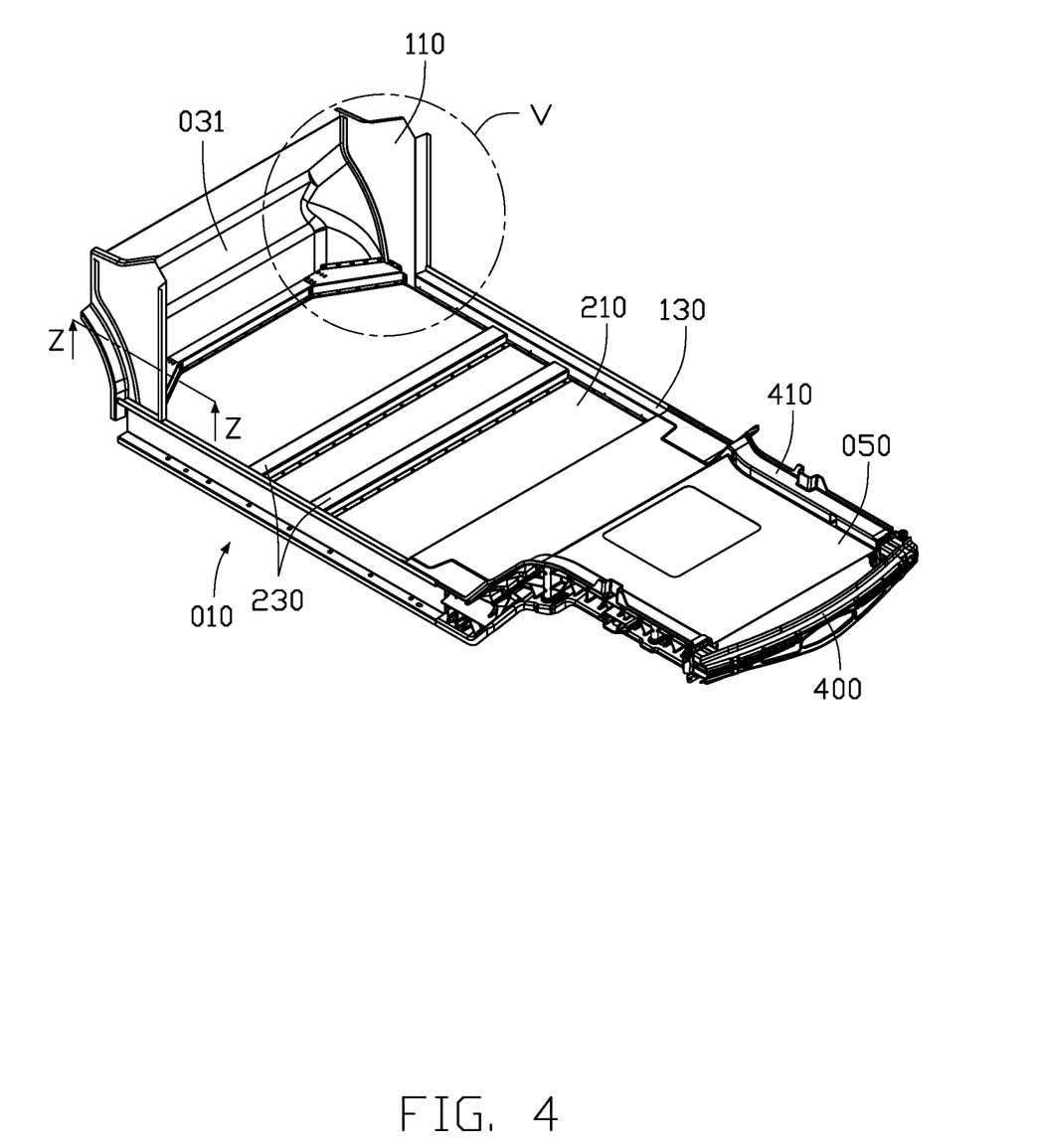
FIG. 4 is a schematic diagram of a firewall, a front floor module, and the modular rear compartment.

Referring to FIGS. 1, 4, and 5, a width of the inner board space 170 is determined by the main board 111 of the front side board 110 and the inner board 131 of the door sill 130. That is, the inner board space 170 is defined between the two main boards 131 and between the two inner boards 131. A floor board 210 is installed in the inner board space 170, and two sides of the floor board 210 are respectively fixedly coupled to the corresponding door sill 130. Since the inner board space 170 has a fixed width, the floor board 210 installed in the inner board space 170 has a fixed width. The vertical boards 113 of the front side boards 110 and the horizontal boards 133 of the door sills 130 extend a predetermined distance away from the inner board space 170, and the outer edge 150 formed by the first flange 115 of the front side board 110 and the second flange 135 of the door sill 130 also extend a predetermined distance away from the inner board space 170.

Vehicles are generally divided into A-class vehicles (compact vehicles), B-class vehicles (medium-sized vehicles), C-class vehicles (medium-large vehicles), and D-class vehicles (luxury vehicles). Lengths of the vehicle body and a wheelbase are different for each vehicle class. Therefore, the vertical board 113 and the horizontal board 133 used in different classes of vehicles have different specifications and widths. Generally, the higher vehicle classes have larger specification widths of the vertical board 113 and the horizontal board 133. For example, D-class vehicles may have the outer edge 150 set further away from the inner board space 170, while A-class vehicles may have the outer edge 150 set closer to the inner board space 170.

The inner board 131 of the door sill 130 passes through the vertical board 113 and is directly fixed to the main board 111 of the front side board 110, so that the door sill 130 is coupled to the front side board 110 with a larger contact area to have a stronger connection strength when fixed by welding or other fixing means, thereby ensuring that the outer frame 100 maintains a certain shape when the modular vehicle body 001 is used, and improving a service life of the modular vehicle body 001.

In order to increase a support strength of the modular vehicle body 001 and provide certain shock absorption performance, a cross beam 230 is provided in the inner board space 170. Two sides of the cross beam 230 are respectively fixed to the corresponding door sill 130. Since the inner board space 170 and the floor board 210 have the same predetermined width, the cross beam 230 installed in the inner board space 170 has a fixed width. Therefore, the cross beam 230 having the fixed width can be used when manufacturing different classes of vehicle bodies, thereby reducing a manufacturing cost of the cross beam 230.

In one embodiment, the modular vehicle body 001 is applied in an electric vehicle, and a battery 250 is arranged on a side of the floor board 210 facing away from the inner board space 170. The battery 250 is used for providing power for the electric vehicle. Since the inner board space 170 has a fixed width, the battery 250 of the same specification can be installed in the vehicle bodies of different vehicle classes.

A complete vehicle body also needs to have an engine compartment and a rear compartment. Therefore, the modular vehicle body 001 further includes a modular engine compartment 030 and a modular rear compartment 050 respectively arranged at opposite ends of the outer frame 100 in a length direction of the outer frame 100.

The modular engine compartment 030 is arranged at an end of the front floor module 010 where the front side board 110 is arranged. The modular engine compartment 030 and the front side board 110 are fixed to realize a connection between the modular engine compartment 030 and the front floor module 010. It is understood that in other embodiments, a position of the modular engine compartment 030 can be fixed in advance, and then the front side board 110 is arranged at one end of the modular engine compartment 030, and then the modular engine compartment 030 and the front side board 110 are fixed to realize the modular engine compartment 030 coupled to the front floor module 010. The position of the front side board 110 in the outer frame 100 corresponds to a front end of the vehicle when the vehicle is moving forward, and the modular engine compartment 030 is arranged on the front end of the vehicle body. The modular engine compartment 030 has a firewall 031 located at an end of the modular engine compartment 030 adjacent to the front floor module 010, and the firewall 031 is fixedly coupled to the front side board 110. The modular engine compartment 030 provides an installation foundation and an installation space for automobile components such as a front suspension system, a steering system, a brake system, and a front motor drive system.

Due to the arrangement of the outer frames 100, the distance between the main boards 111 of the two outer frames 100 is fixed. The main boards 111 are used as an installation basis of the modular engine compartment 030, and a relative spacing between the main boards 111 is fixed, so that the modular engine compartment 030 of the same specification can be used in each vehicle class, thereby reducing the design cost of the modular engine compartment 030 and shortening a design cycle of the modular engine compartment 030.

The modular engine compartment 030 further includes a crash box 300 arranged at a front end of the modular engine compartment 030 facing away from the outer frame 100 for bearing a front-end collision impact. Specifically, the crash box 300 includes two energy absorbing boxes 310 coupled to the modular engine compartment 030. The two energy absorbing boxes 310 extend along the length of the vehicle body. The D-class vehicles may have longer energy-absorbing boxes 310, so that the modular engine compartment 030 and the crash box 300 have a larger overall span in the length direction, and the A-class vehicles may have shorter energy absorbing boxes 310, so that the modular engine compartment 030 and the crash box 300 have a smaller overall span in the length direction.

An arcuate board 117 is provided on a side of the front side board 110 adjacent to the modular engine compartment 030. The arcuate board 117 and the main board 111 are integrally formed. The arcuate board 117 is used to fix a wheel house, and a space for accommodating a wheel is defined by the arcuate board 117.

The modular rear compartment 050 is arranged at an end of the vehicle body opposite to the front floor module 010 and the front side board 110. The modular rear compartment 050 is fixedly coupled to the floor board 210 and the door sill 130 to couple the modular rear compartment 050 to the front floor module 010. It is understandable that in other embodiments, a position of the modular rear compartment 050 can be fixed in advance, and then the modular rear compartment 050 is fixed to the floor board 210 and the door sill 130 to couple the modular rear compartment 050 to the front floor module 010. The modular rear compartment 050 is arranged at a rear end of the vehicle body when the vehicle moves forward.

A rear frame 400 is arranged at a rear end of the modular rear base board 050 to increase a strength of the modular rear compartment 050. The rear frame 400 is fixed to an end of the modular rear compartment 050 facing away from the outer frame 100. Specifically, the rear frame 400 includes two fixed rods 410 coupled to the modular rear compartment 050. The two fixed rods 410 extend along the length of the vehicle body. When the D-class vehicle is manufactured, longer fixed rods 410 can be used, so that the modular rear compartment 050 and the rear frame 400 have a larger overall span in the length direction, and when the A-class vehicle is manufactured, shorter fixed rods 410 can be used, so that the modular rear compartment 050 and the rear frame 400 have a smaller overall span in the length direction.

Figure 3:
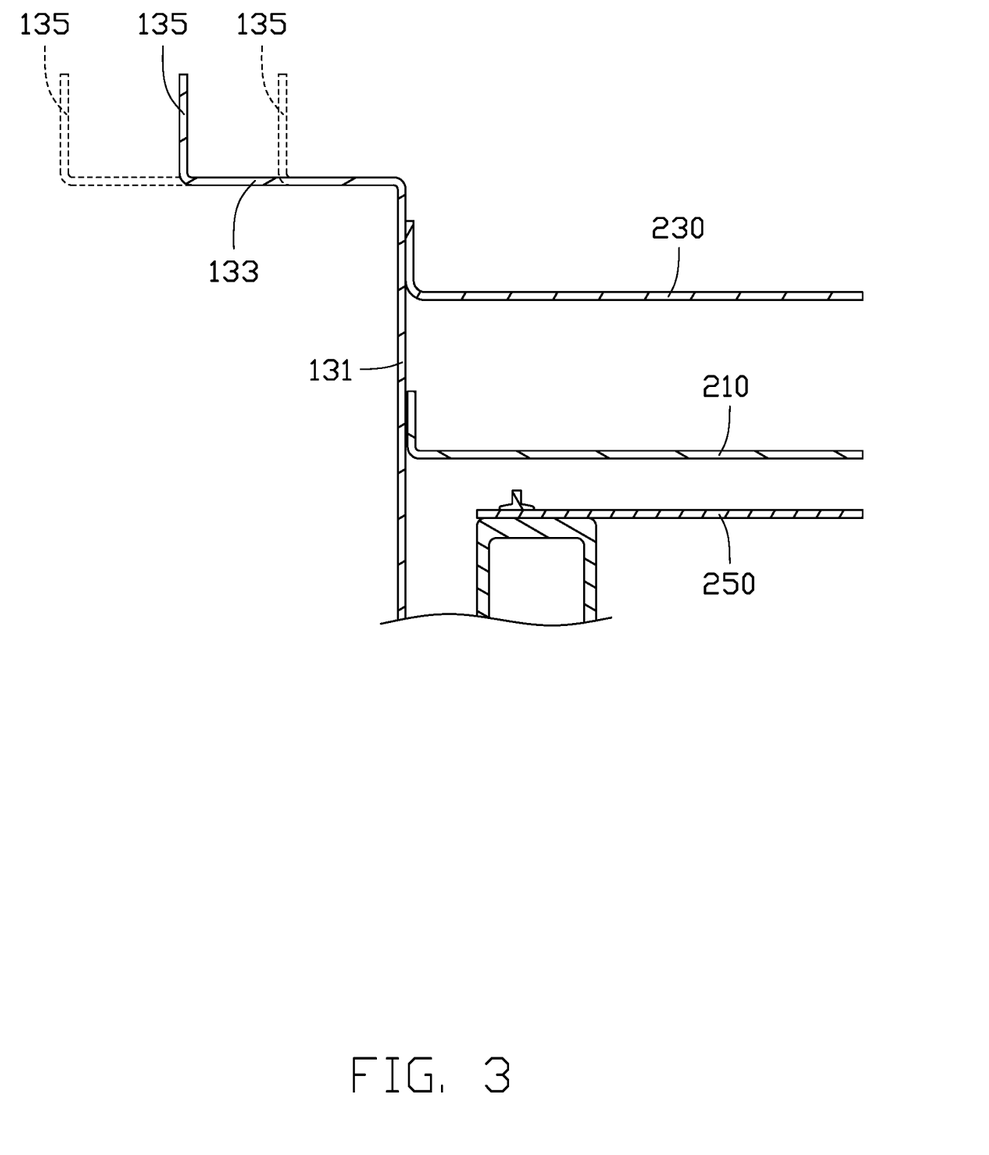
FIG. 3 is a cross-sectional view taken along line X-X in FIG. 2.
Figure 6:
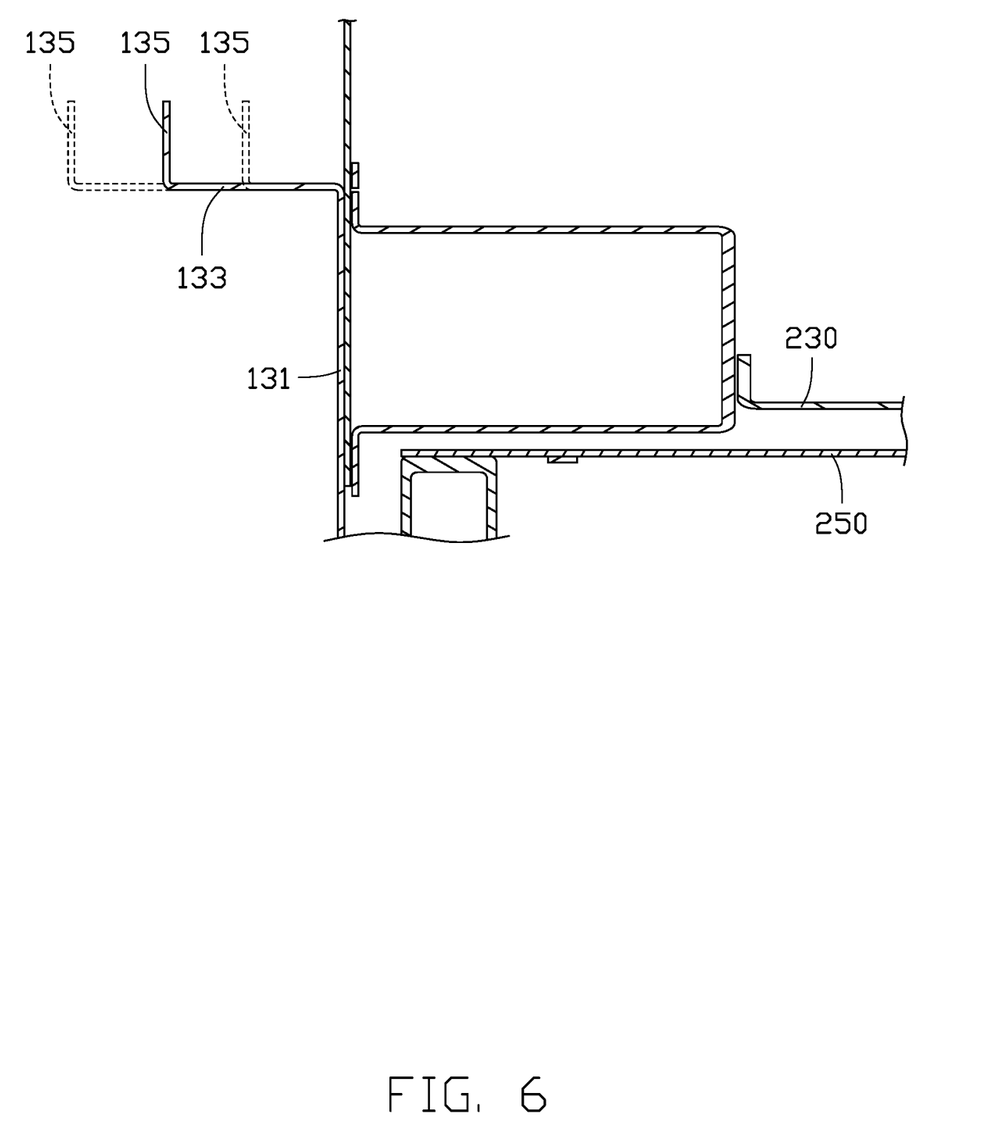
FIG. 6 is a cross-sectional view taken along line Y-Y in FIG. 2.
Figure 7:
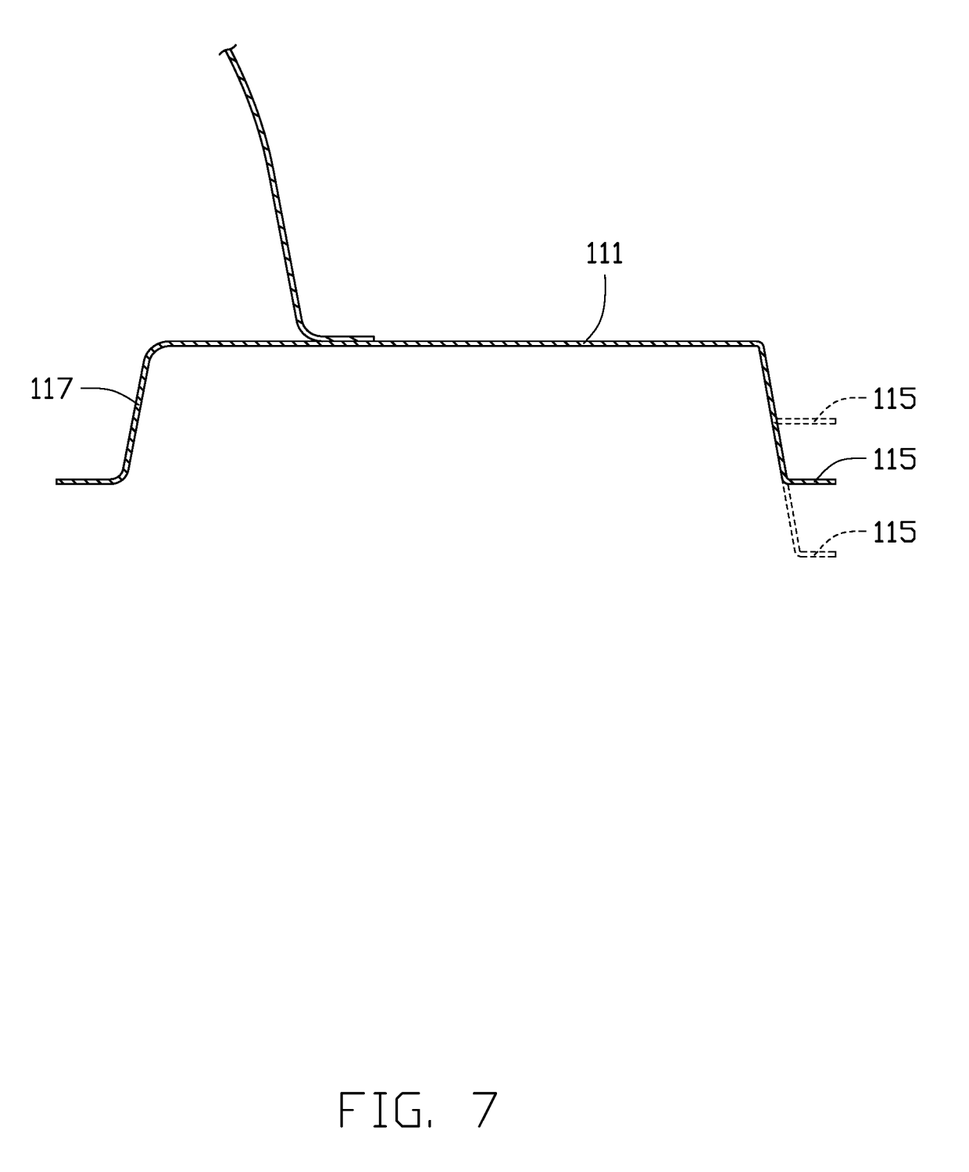
FIG. 7 is a cross-sectional view taken along line Z-Z in FIG. 4.

According to this application, it is possible to form at least three vehicle bodies with different widths corresponding to three different vehicle classes, respectively. FIG. 3 shows a cross-section of the vehicle bodies taken along line X-X in FIG. 2. FIG. 6 shows a cross-section of the vehicle bodies taken along line Y-Y in FIG. 2. FIG. 7 shows a cross-section of the vehicle bodies taken along line Z-Z in FIG. 4. Solid lines represent a position of the outer edge 150 in a first vehicle class, and dotted lines represent a position of the outer edge 150 in second and third vehicle classes. The outer edge 150 of the second vehicle class is located on a side of the outer edge 150 of the first vehicle class closer to the inner board space 170, and the outer edge 150 of the third vehicle class is located on a side of the outer edge 150 of the first vehicle class further from the inner board space 170. The positions of the inner boards 131 corresponding to the three vehicle classes are the same, so that the inner board space 170 of the same width is used to install the floor board 210 and the cross beam 230 of the same width. At the same time, the positions of the main boards 111 of the three vehicle classes are the same, so that the vehicle bodies of the three vehicle classes can use the modular engine compartment 030 with the same width.

Specifically, the first vehicle class has a vehicle width of 1950 mm, and the second vehicle class has a vehicle width of 1900 mm, and the third vehicle class has a vehicle width of 2010 mm. The vertical board 113 of the front side board 110 of the second vehicle class is 25 mm narrower than the vertical board 113 of the front side board 110 of the first vehicle class. Correspondingly, the horizontal board 133 of the door sill 130 of the second vehicle class is 25 mm narrower than the horizontal board 133 of the door sill 130 of the first vehicle class. Thus, both sides of the vehicle body of the second vehicle class are reduced by 50 mm in total compared to the first vehicle class. The vertical board 113 of the front side board 110 of the third vehicle class is 30 mm wider than the vertical board 113 of the front side board 110 of the first vehicle class. Correspondingly, the horizontal board 133 of the door sill 130 of the third vehicle class is 30 mm wider than the horizontal board 133 of the door sill 130 of the first vehicle class. Thus, both sides of the vehicle body of the third vehicle class are widened by 50 mm in total compared to the vehicle body of the first vehicle class.

In summary, the outer edge 150 determines the width of the modular vehicle body 001. By selecting the extension specifications of the vertical board 113 and the horizontal board 133 in the outer frames 100, the modular vehicle body 001 can be adapted to shells of different vehicle classes. The floor board 210, the cross beam 230, and other components of the modular vehicle body 001 between the outer frames 100 all have a fixed width, thereby reducing the design cost and shortening the design cycle. In the outer frames 100, the front side board 110 and the door sill 130 are directly fixed by the main board 111 and the inner board 131 and have a larger contact area, thereby providing a higher connection strength.

The present application further provides a method for manufacturing a modular vehicle body. The method includes the following steps.

In step A, according to a width of the vehicle body, a front side board with a vertical board having a corresponding specification width is selected.

In step B, according to the width of the vehicle body, a door sill with a horizontal board having a corresponding specification width is selected.

In step C, according to a length of the vehicle body, the door sill having a corresponding specification length is selected.

In step D, an inner board of the door sill is directly fixed to a main board of the front side board, and a first flange of the vertical board and a second flange of the horizontal board form an outer edge of the vehicle body.

In step E, according to a specification length of the door sill, a corresponding floor board is selected and arranged in an inner board space, and two sides of the floor board are respectively fixed to the corresponding door sill.

In step F, a cross beam is arranged in the inner board space, and two sides of the cross beam are respectively fixed to the corresponding door sill.

In step G, a battery is fixedly arranged in the inner board space.

In step H, a modular engine compartment is arranged on a side of the front side board facing away from the door sill and fixed to the front side board.

In step I, a size of energy absorbing boxes in a crash box along the length of the vehicle body is determined according to the length of the vehicle body, and the crash box is fixed at an end of the modular engine compartment facing away from the outer frame.

In step J, a modular rear compartment is arranged at an end of the floor board facing away from the front side board and fixedly coupled to the floor board, and the modular rear compartment is coupled to the door sill.

In step K, a size of a rear frame along the length of the vehicle body is determined according to the length of the vehicle body and fixed to an end of the modular rear compartment facing away from the outer frame.

Steps A-K as described above may be performed in different order.

In step C, the door sills of different lengths are selected to realize length control of different vehicle classes. Because the door sills of different lengths are selected, inner board spaces of different lengths are defined, and the floor board set in the inner board space will also have different length specifications.

Figure 8:
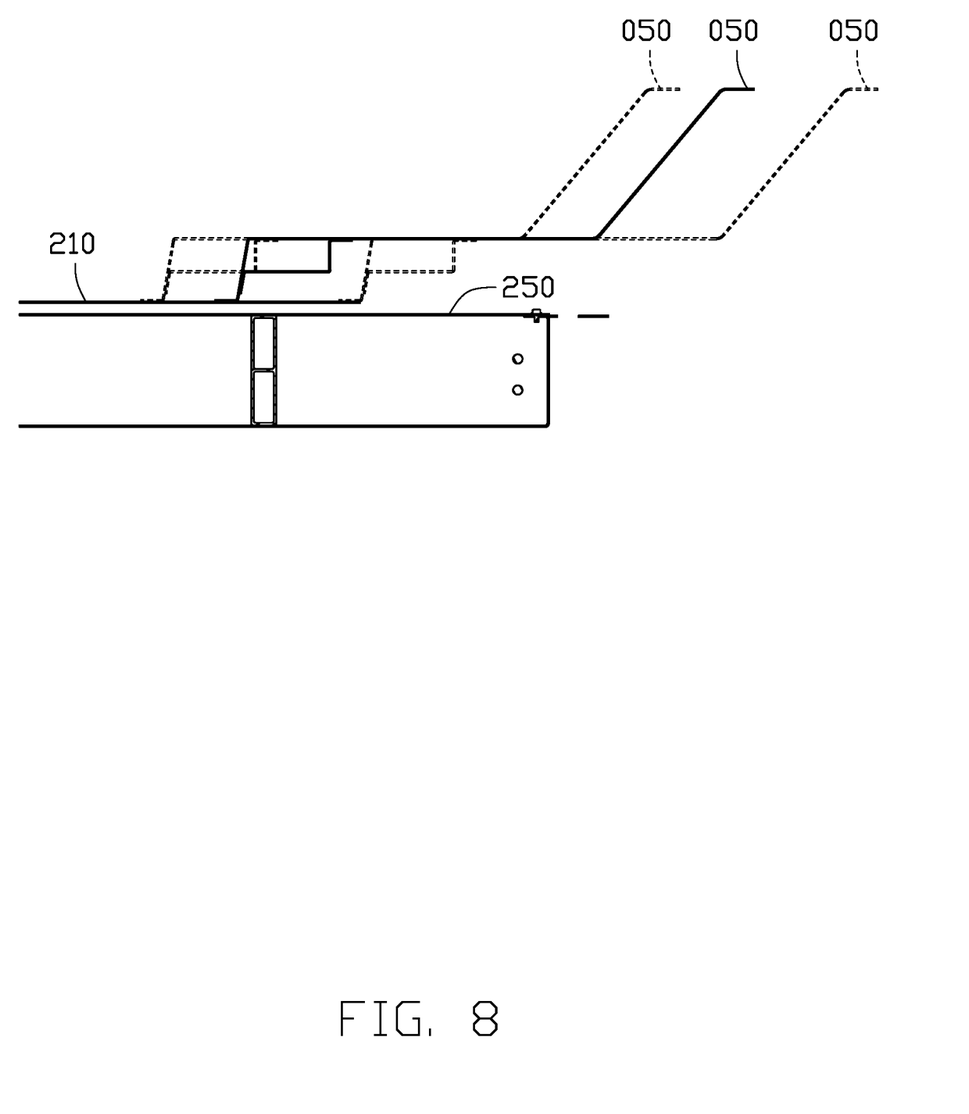
FIG. 8 is a cross-sectional view taken along line N-N in FIG. 2.

FIG. 8 shows a vehicle body of three different vehicle classes taken along line N-N in FIG. 2. Solid lines represent a position of the floor board 210 and the modular rear compartment 050 of the first vehicle class, and dashed lines represent the positions of the floor board 210 and the modular rear compartments 050 of the second vehicle class and the third vehicle class. The three vehicle classes use the same modular rear compartment 050, and the modular rear compartment 050 is coupled to the end of the floor board 210. Therefore, an installation position of the modular rear compartment 050 can be controlled according to the length of the floor board 210 along the length of the vehicle body to match the length of the vehicle body of different vehicle classes.

Specifically, the first vehicle class has a wheelbase of 2950 mm, the second vehicle class has a wheelbase of 2860 mm, and the third vehicle class has a wheelbase of 3100 mm. In the second vehicle class, the length of the door sill 130 is shorter than the length of the door sill 130 in the first vehicle class 90 mm. Correspondingly, the floor board 210 of the second vehicle class is shorter than the floor board 210 of the first vehicle class by 90 mm. Therefore, relative to the first vehicle class, the modular rear compartment 050 of the second vehicle class is 90 mm closer to the modular engine compartment 030. In the third vehicle class, the length of the door sill 130 is longer than the length of the door sill 130 in the first vehicle class 150 mm. Correspondingly, the floor board 210 of the second vehicle class is longer than the floor board 210 of the first vehicle class by 150 mm. Therefore, relative to the first vehicle class, the modular rear compartment 050 of the third vehicle class is 150 mm further from the modular engine compartment 030.

Through the modular vehicle body 001 manufacturing method provided in the present application, the modular vehicle body 001 is used to adapt to the widths of different vehicle classes, and the specification length of the door sills 130 and the corresponding length of the floor board 210 can be selected to adapt to the lengths of the different vehicle classes, thereby reducing the design cost and shortening the design cycle.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A modular vehicle body comprising:
a pair of oppositely arranged outer frames, an inner board space with a fixed width defined between the pair of outer frames; wherein:
each outer frame comprises a front side board and a door sill;

the front side board comprises a main board provided with a vertical board, the vertical board extending away from the inner board space and having a predetermined width, and a first flange provided on a side of the vertical board facing away from the inner board space;

the door sill comprises an inner board provided with a horizontal board, the horizontal board extending away from the inner board space and having a predetermined width, and a second flange provided on a side of the horizontal board facing away from the inner board space;

the inner board is fixedly coupled to the main board, and the first flange and the second flange form an outer edge;

a width between the outer edges of the pair of outer frames is set to correspond to a width of a vehicle body; and the widths of the vertical board and the horizontal board are selected to adapt to different classes of vehicles.

2. The modular vehicle body of claim 1, further comprising a modular engine compartment, wherein:

the front side boards of the pair of outer frames are installed at one end of the modular engine compartment.

3. The modular vehicle body of claim 2, further comprising an crash box, wherein:

the crash box is fixed at an end of the modular engine compartment facing away from the pair of outer frames.

4. The modular vehicle body of claim 2, wherein:

an arcuate board for fixing a wheel house is provided on a side of the front side board adjacent to the modular engine compartment.

5. The modular vehicle body of claim 1, further comprising a floor board, wherein:

the floor board is arranged in the inner board space; and two sides of the floor board are respectively fixedly coupled to the corresponding door sill.

6. The modular vehicle body of claim 5, further comprising a cross beam, wherein:

the cross beam is arranged on the floor board; and two sides of the cross beam are respectively fixedly coupled to the corresponding door sill.

7. The modular vehicle body of claim 5, further comprising a battery, wherein:

the battery is arranged on a surface of the floor board facing away from the inner board space.

8. The modular vehicle body of claim 5, further comprising a modular rear compartment, wherein:

the modular rear compartment is arranged at an end of the floor board facing away from the front side board and fixedly coupled to the floor board.

9. The modular vehicle body of claim 8, further comprising a rear frame, wherein:

the rear frame is fixed on an end of the modular rear compartment facing away from the pair of outer frames.

10. A method for manufacturing a modular vehicle body, the method comprising:

selecting front side boards with a vertical board having a corresponding specification width according to a width of a vehicle body;

selecting door sills with a horizontal board having a corresponding specification width according to a width of the vehicle body;

selecting the door sills having a corresponding specification length according to a length of the vehicle body;

directly fixing an inner board of each door sill to a main board of each front side board to form a pair of outer frames, a first flange of each vertical board and a second flange of each horizontal board forming an outer edge of the vehicle body; and arranging the pair of outer frames opposite each other, the pair of outer frames defining an inner board space therebetween.

\* \* \* \* \*